US007862182B2

(12) United States Patent
Thollot et al.

(10) Patent No.: US 7,862,182 B2
(45) Date of Patent: Jan. 4, 2011

(54) OPTICAL SYSTEM FOR A PROJECTOR, AND CORRESPONDING PROJECTOR

(75) Inventors: Julien Thollot, Betton (FR); Khaled Sarayeddine, Nouvoitou (FR); Pascal Benoit, Liffre (FR)

(73) Assignee: Thomson Licensing, Boulogne-Billancourt (FR)

( * ) Notice: Subject to any disclaimer, the term of this patent is extended or adjusted under 35 U.S.C. 154(b) by 411 days.

(21) Appl. No.: 11/821,944

(22) Filed: Jun. 25, 2007

(65) Prior Publication Data

US 2008/0094578 A1   Apr. 24, 2008

(30) Foreign Application Priority Data

Jun. 30, 2006   (FR) ................................. 06 52724

(51) Int. Cl.
*G03B 21/14* (2006.01)

(52) U.S. Cl. .............................. 353/84; 353/8; 353/10; 353/20; 353/31; 353/82; 353/99; 353/102; 348/42; 348/51; 348/54; 348/55; 348/57; 348/58; 348/742; 348/743; 348/771; 349/5; 349/7; 349/9

(58) Field of Classification Search .................. 353/8, 353/10, 20, 31, 82, 84, 99, 102; 348/42, 348/51, 54, 55, 57, 58, 742, 743, 771; 349/5, 349/7, 9; 359/207.9, 226.1, 386, 437, 441, 359/458, 502, 494, 496, 837
See application file for complete search history.

(56) References Cited

U.S. PATENT DOCUMENTS

| | | | | |
|---|---|---|---|---|
| 5,993,007 A | * | 11/1999 | Jung | 353/34 |
| 6,147,720 A | * | 11/2000 | Guerinot et al. | 348/744 |
| 6,247,816 B1 | * | 6/2001 | Cipolla et al. | 353/31 |
| 6,547,396 B1 | * | 4/2003 | Svardal et al. | 353/8 |
| 6,646,806 B1 | * | 11/2003 | Bierhuizen | 359/618 |
| 6,962,414 B2 | * | 11/2005 | Roth | 353/20 |
| 7,077,524 B2 | * | 7/2006 | Roth | 353/20 |
| 2003/0071973 A1 | * | 4/2003 | Hansen et al. | 353/20 |
| 2004/0090601 A1 | | 5/2004 | Nakanishi | |
| 2004/0184005 A1 | | 9/2004 | Roth | |
| 2006/0092380 A1 | * | 5/2006 | Salsman et al. | 353/20 |
| 2006/0203209 A1 | * | 9/2006 | De Vaan | 353/84 |
| 2007/0216869 A1 | * | 9/2007 | Kawase et al. | 353/20 |

FOREIGN PATENT DOCUMENTS

EP    0372905    6/1990

(Continued)

OTHER PUBLICATIONS

Search Report dated Mar. 23, 2007.

*Primary Examiner*—Goergia Y Epps
*Assistant Examiner*—Sultan Chowdhury
(74) *Attorney, Agent, or Firm*—Robert D. Shedd; Jeffrey M. Navon

(57) ABSTRACT

Optical system for a projector, comprising:
  at least a first polarizing beam splitter for splitting a source illumination beam into a first illumination beam linearly polarized along a first direction and a second illumination beam polarized perpendicular to the first direction;
  at least one color wheel intersecting the polarized illumination beams in two different regions and producing a first color beam linearly polarized along the first direction and a perpendicularly polarized second color beam; and
  two imagers illuminated by the first and second polarized color beams respectively.

9 Claims, 4 Drawing Sheets

FOREIGN PATENT DOCUMENTS

| | | |
|---|---|---|
| EP | 1098537 | 5/2001 |
| EP | 1100259 | 5/2001 |
| FR | 2872924 | 1/2006 |
| WO | WO0110137 | 2/2001 |
| WO | WO0137576 | 5/2001 |

* cited by examiner

OPTICAL SYSTEM FOR A PROJECTOR, AND CORRESPONDING PROJECTOR

This application claims the benefit, under 35 U.S.C. §119 of France Patent Application 0652724, filed 30 Jun. 2006.

1. FIELD OF THE INVENTION

The invention relates to the field of image projection.

More precisely, the invention relates to an imaging illumination system in a video projector of the front-projection type or in a back-projector.

2. TECHNOLOGICAL BACKGROUND

According to the prior art, as illustrated in FIG. 1, an illumination system 10 illuminating an imager 11 is used.

Conventionally, the illumination system 10 comprises:
an illumination source 100 with an elliptical reflector;
a colour wheel 107;
a rectangular guide 102; and
a system of several relay lenses 104 to 106.

The illumination source 100 illuminates, with a light beam 101, the colour wheel 107 placed at the entrance of the rectangular guide 102, at the focus of the elliptical reflector of the source 100. The rectangular guide 102 is used to convert the circular cross section of the illumination beam into a rectangular cross section and to make the beam spatially uniform.

The exit of the guide 102 is imaged on the imager 11 via the system of relay lenses, a minimum number of lenses being two, but often there being three or four lenses, the illumination moreover being preferably telecentric.

If the imager 11 is of the DMD type (Digital Micromirrors Device from Texas Instruments®), a TIR prism 12 is placed between the illumination system 10 and the imager 11 in order to split the illumination and imaging beams. The TIR prism 12 is unnecessary if the imager 11 is of the transmissive LCD (Liquid Crystal Display) type or is replaced with a dichroic PBS (Polarizing Beam Splitter) if the imager 11 is of the LCOS (Liquid Crystal On Silicon) type. Such a system has the drawback of limited luminosity.

To offer greater luminosity, projectors employ three imagers, each associated with one colour. However, such systems are relatively expensive.

3. SUMMARY OF THE INVENTION

The object of the invention is to alleviate these drawbacks of the prior art.

More particularly, the objective of the invention is to provide a more powerful imaging flux, while still remaining relatively inexpensive.

For this purpose, the invention provides an optical system for a projector, comprising:
at least one illumination source suitable for producing a source illumination beam;
at least a first polarizing beam splitter for splitting the source illumination beam into a first illumination beam linearly polarized along a first direction and a second illumination beam polarized perpendicular to the first direction;
at least one colour wheel intersecting the first and second polarized illumination beams in two different regions and producing a first colour beam linearly polarized along the first direction and a second colour beam polarized perpendicular to the first direction;
a first imager illuminated by the first colour beam linearly polarized along the first direction and producing a first imaging beam; and
a second imager illuminated by the second colour beam polarized perpendicular to the first direction and producing a second imaging beam.

Thus, the two polarizations of the incident beam are used, thus minimizing the number of components in the optical illumination/imaging system.

Advantageously, the system includes at least a second polarizing beam splitter suitable for combining the first imaging beam with the second imaging beam in order to form a third imaging beam.

According to an advantageous feature, the two separate regions are associated, at each instant, with colour segments of different colours.

According to one particular feature, the two separate regions are associated, at each instant, with colour segments of complementary colours.

According to another feature, at instances when one of the two regions is associated with a colour segment of green colour, the other region is associated with a colour segment of red colour, and in that, at the instances when one of said two regions is associated with a colour segment of yellow colour, the other region is associated with a colour segment of blue colour.

According to various embodiments, the first and second imagers are of the LCOS or transmissive LCD type.

According to various features, the first polarizing beam splitter is of the grating polarizer type or dichroic type.

The invention also relates to a projector comprising an optical system according to the invention as presented above.

4. LIST OF THE FIGURES

The invention will be more clearly understood, and other particular aspects and advantages will become apparent, upon reading the description that follows, the description referring to the appended drawings in which.

5. DETAILED DESCRIPTION OF THE INVENTION

Figure 1:
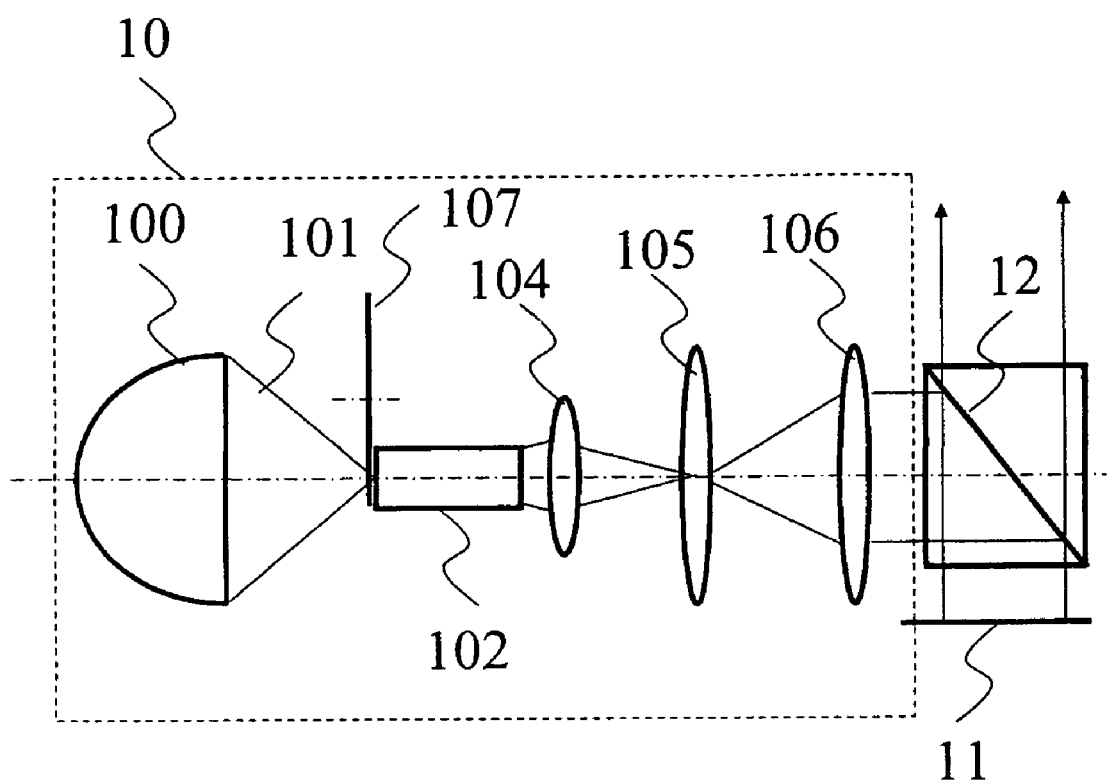
FIG. 1 illustrates an illumination system known per se.
Figure 2:
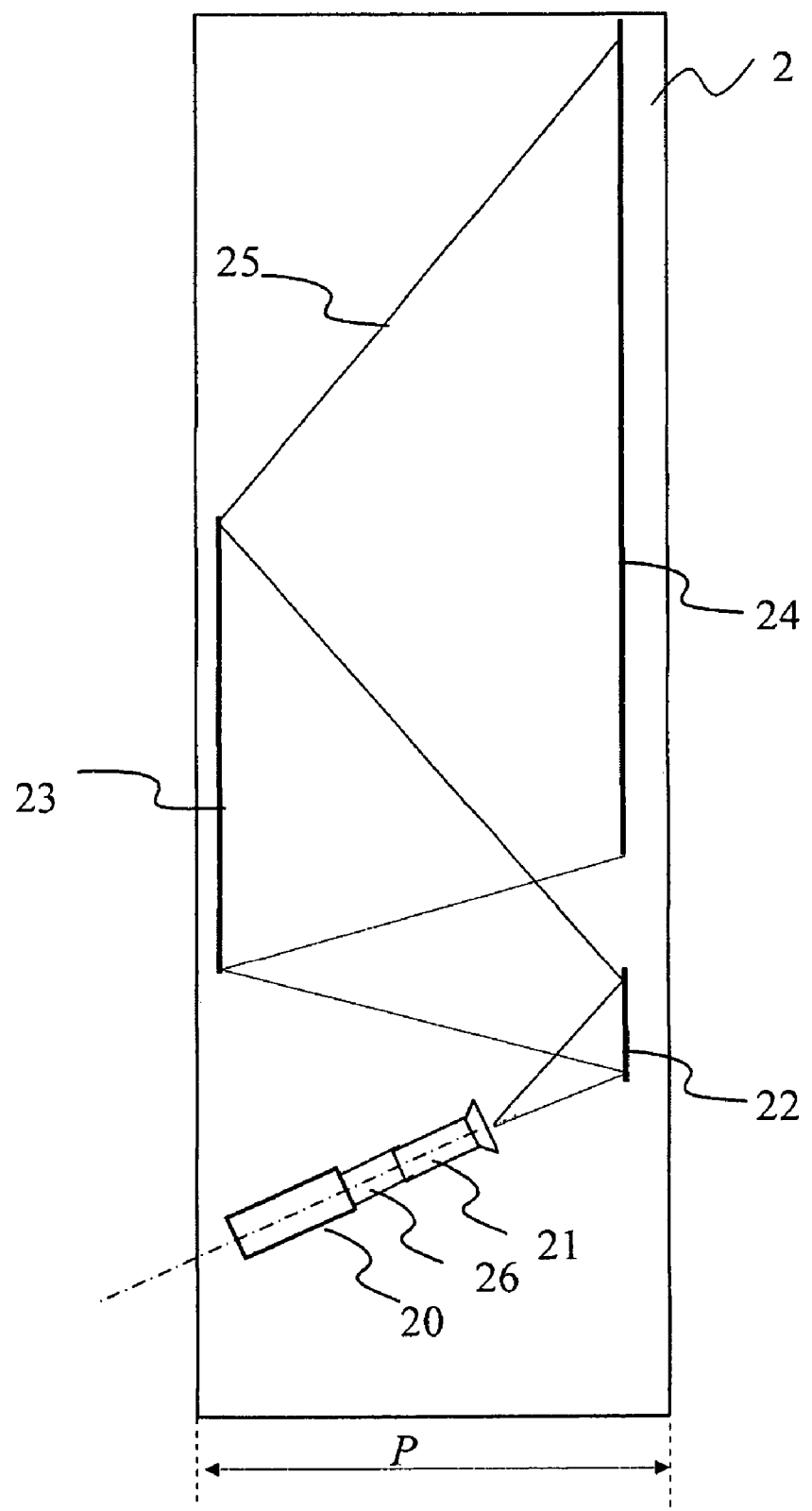
FIG. 2 is a highly schematic synoptic view of a back-projector according to one embodiment of the invention.

FIG. 2 is a highly schematic synoptic view of a back-projector 2 according to a first embodiment of the invention.

The projector 2 comprises:
an illumination system 20;
an objective 21 that receives an imaging beam 26 created by the system 20 and produces a beam 25;
a back-projection screen 24 illuminated by the beam 25; and
two folding mirrors 22 and 23 that fold the beam 25 and make it possible to reduce the depth P of the projector 2.

The objective 21, the mirrors 22 and 23 and the screen 24, together with their arrangement, are well known to those skilled in the art and will not be described in further detail.

Figure 3:
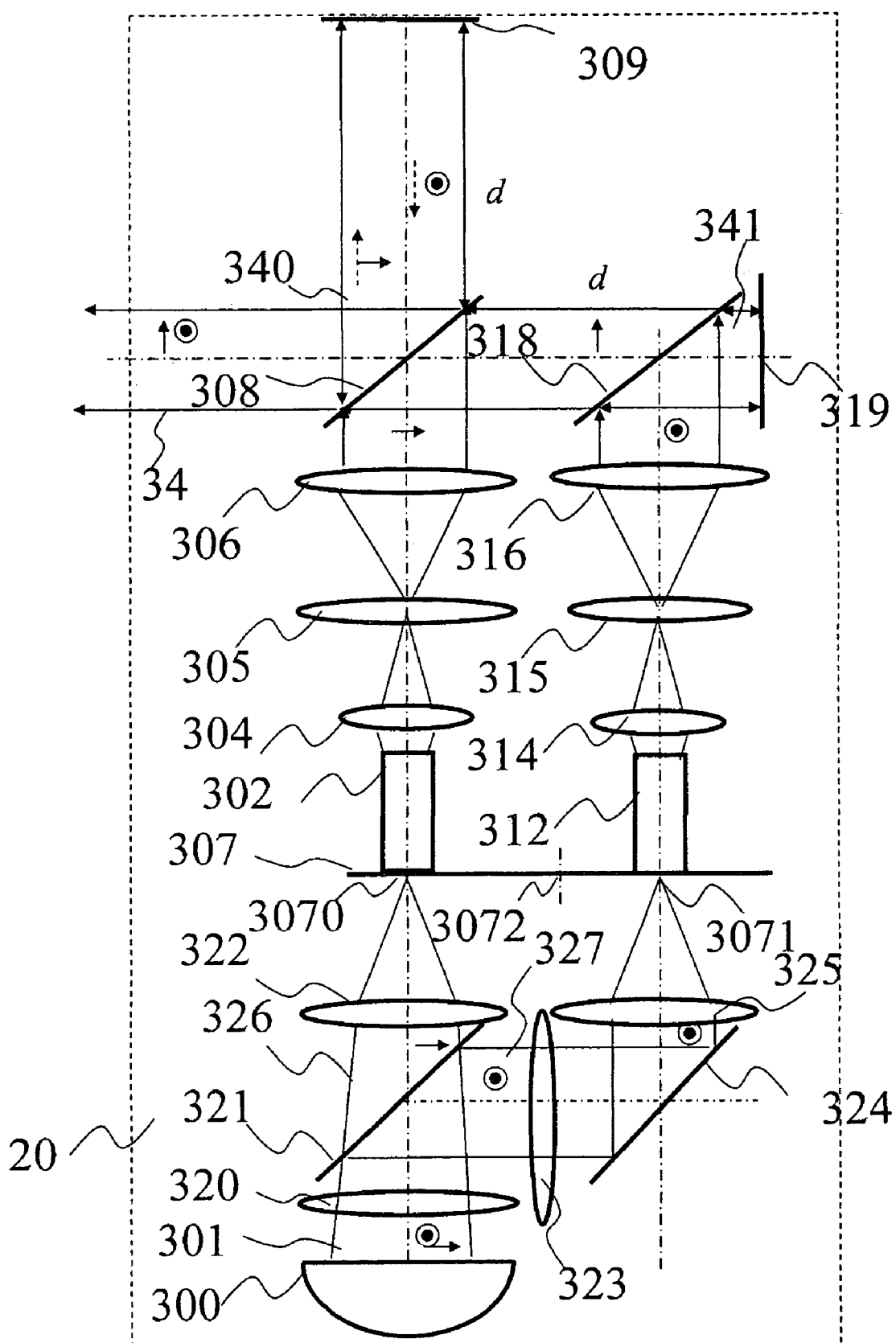
FIG. 3 shows an imaging system used in the back-projector of FIG. 2.

FIG. 3 illustrates in detail the imaging system 20 with its imager (also called a micro display) of the LCOS type, which system comprises:

a projection lamp 30 with a reflector producing an illumination beam 301;

a lens or a system of lenses 320 for increasing the focal length of the beam 301;

a polarizing beam splitter 321 (for example a grating polarizer as illustrated (for example of the Moxtek® type)) which splits the beam 301 into a first beam 326 of horizontal polarization (i.e. a linear polarization along a first direction in the plane of FIG. 3 (perpendicular to the propagation direction of the beam, the first direction being shown symbolically by an arrow in FIG. 3), which passes through the splitter 321, and a second beam 327 of vertical polarization (i.e. a linear polarization perpendicular to the first direction, the direction of this polarization being shown symbolically by a point inside a circle), which is reflected by the splitter 321, and the splitter being inclined to the axis of the beam 301;

a colour wheel 307 cutting the illumination beam 326 and the beam 327 in two separate regions;

a first rectangular guide 302 placed behind and close to the colour wheel 307, said guide being used to convert the circular cross section of the beam 326 into a rectangular cross section and to make the beam spatially uniform;

a lens or a system of lenses 322 for focusing the beam 326 on the entrance of the guide 302 in a first focal point (or point) 3070;

a second rectangular guide 312 placed behind the colour wheel 307 and used to convert the circular cross section of the beam 327 into a rectangular cross section and to make the beam spatially uniform:

lenses (or systems of lenses) 323 and 325 that are placed on either side of a mirror 324, which reflects the beam 327 in a direction parallel to the axis of the beam 326, the lenses 323 and 325 making it possible to focus the beam 327 onto the entrance of the guide 312 in a second point (or point) 3071 separate from the first focal point 3070;

a first system of several relay lenses 304 to 306, which image the exit of the guide 302 onto a first imager 309;

a polarizing beam splitter 308 inclined at 45° to the axis of the beam 326, through which splitter the beam 326 passes, the splitter 308 letting through the horizontal polarization and reflecting the vertical polarization;

the first LCOS imager 309, which is illuminated by the horizontally-polarized illumination beam 326 and reflects a vertically-polarized first imaging beam 340 onto the splitter 308;

a system of several relay lenses 314 to 316, which image the exit of the guide 312 onto a second imager 319;

a polarizing beam splitter 318 which is inclined at 45° to the axis of the beam 327 and reflects the beam 327, the splitter 318 letting through the horizontal polarization and reflecting the vertical polarization; and the second LCOS imager 319, which is illuminated by the vertically-polarized illumination beam 327 and reflects a horizontally-polarized second imaging beam 341 onto the splitter 318.

Preferably, the optical paths traveled by the beams between the entrance of the respective guides 302 and 312 and the entry of the objective 21 are the same (in other words, the distances d separating the splitter 318 from the respective imagers 309 and 319 are the same).

Advantageously, the optical assembly comprising the source 300 and the lenses 320 and 326 allows the beam 326 to be focused near the colour wheel 307 at the entry of the guide 302 onto the point 3070. Thus, the position of the lamp in the source 300, the shape of the reflector (for example parabolic or elliptical shape, the lamp being placed at the focus) and the shape and position of the lenses 320 and 326 are adapted so as to focus the beam onto the point 3070.

Advantageously, the optical assembly comprising the source 300, the splitter 321, the mirror 324 and the lenses 320, 323 and 325 allows the beam 327 to be focused near the colour wheel 307 at the entry of the guide 312 onto the point 3071. Thus, the position of the lamp in the source 300, the shape of the reflector, the position and orientation of the splitter 321 and of the mirror 324 and the shape and position of the lenses 320, 323 and 325 are adapted so as to focus the beam onto the point 3071.

Since the polarization of the beam 340 is vertical (after change in polarization of the horizontally-polarized beam 326), it is reflected by the splitter 308.

Since the polarization of the beam 341 is horizontal (after the change in polarization of the vertically-polarized beam 327), it is transmitted by the splitter 318 and then by the splitter 308, which is also placed in the path of the beam 341.

The two beams 340 and 341 then combine to form a single imaging beam 34.

The colour wheel 307 comprises several (for example 3, 4, 5 or 6) colour segments. Preferably, the focal points 3070 and 3071 are sufficiently far apart to allow easy mechanical positioning of the optical elements 321 to 325, 302, 312, 304 to 306 and 314 to 316. Advantageously, the two focal points are such that they allow the beams 326 and 327 to cut the wheel in two regions belonging to segments of different colours. The two regions are, for example opposed relative to the axis of rotation 3072 of the wheel 307. According to a variant, the two regions are placed at the same distance from the axis 3072 along radii of the wheel 307 that make an angle of 120° between them. Thus, the beams 340 and 341 are of different colours at a given instant. In this way, the "rainbow effect" or "colour break-up" can be suppressed or reduced. For example, in one embodiment of a colour wheel 307 having three segments coloured red, green and blue respectively, the beam 340 is red (respectively blue, red) when the beam 341 is green or blue (respectively green or red, green or blue).

In an advantageous variant of the invention, the colour wheel 307 comprises six segments of respective colours red, green, blue, cyan, magenta and yellow. According to one particular embodiment allowing a reduction in colour break-up or implementation of an anti-pirating system, at any instant the beams 326 and 327 cut the wheel in segments of complementary colours. Red (respectively blue, green) is complementary with cyan, (respectively yellow, magenta). An anti-pirating system is described in the patent application published under reference WO05/027529 and entitled "Methods of processing and displaying images and display device using the methods". To combat the copying of images by filming them during their display, for example using a camera in a cinema, an image display method is employed on the basis of at least one source image in which a plurality of images are displayed in succession and in which, in at least one pixel, the colour of the displayed images is different from the colour in the source image, and the resultant of the colours of the displayed images is the colour in the source image. Thus, since the invention allows several beams of different colours to be superposed, it increases the flexibility of implementing an anti-pirating system and the number of possible parameters (colour combinations and display rate in particular).

According to another particular embodiment also allowing colour break-up to be reduced, the colour wheel 307 comprises at least four segments of respective colours red, green, blue and yellow. In this embodiment, at each instant, the beams 326 and 327 cut the wheel in segments having colours that are antagonistic in respect of the human cognitive and visual system. Red (respectively blue) is antagonistic vis-à-vis with green (respectively yellow).

According to alternative embodiments of the invention, one, two or three grating splitters 321, 308 and 318 are replaced with other types of splitters, for example a polarizing splitter plate or a PBS (Polarizing Beam Splitter) cube (a polarization p replacing the horizontal polarization and a polarization s replacing the vertical polarization, these polarizations both being linear).

The elements of the imaging system 20 have been shown in exploded form. To increase the compactness of the system, the mirror 324 may be brought closer to the splitter 321 so that the elements 302, 304 to 306 and 308 are closer to, but without intersecting, the elements 312, 314 to 316 and 318. Likewise, the imager 319 may be tangential to the splitter 318 (or may be affixed thereto if they are dichroic PBS splitters of cubic shape).

Figure 4:
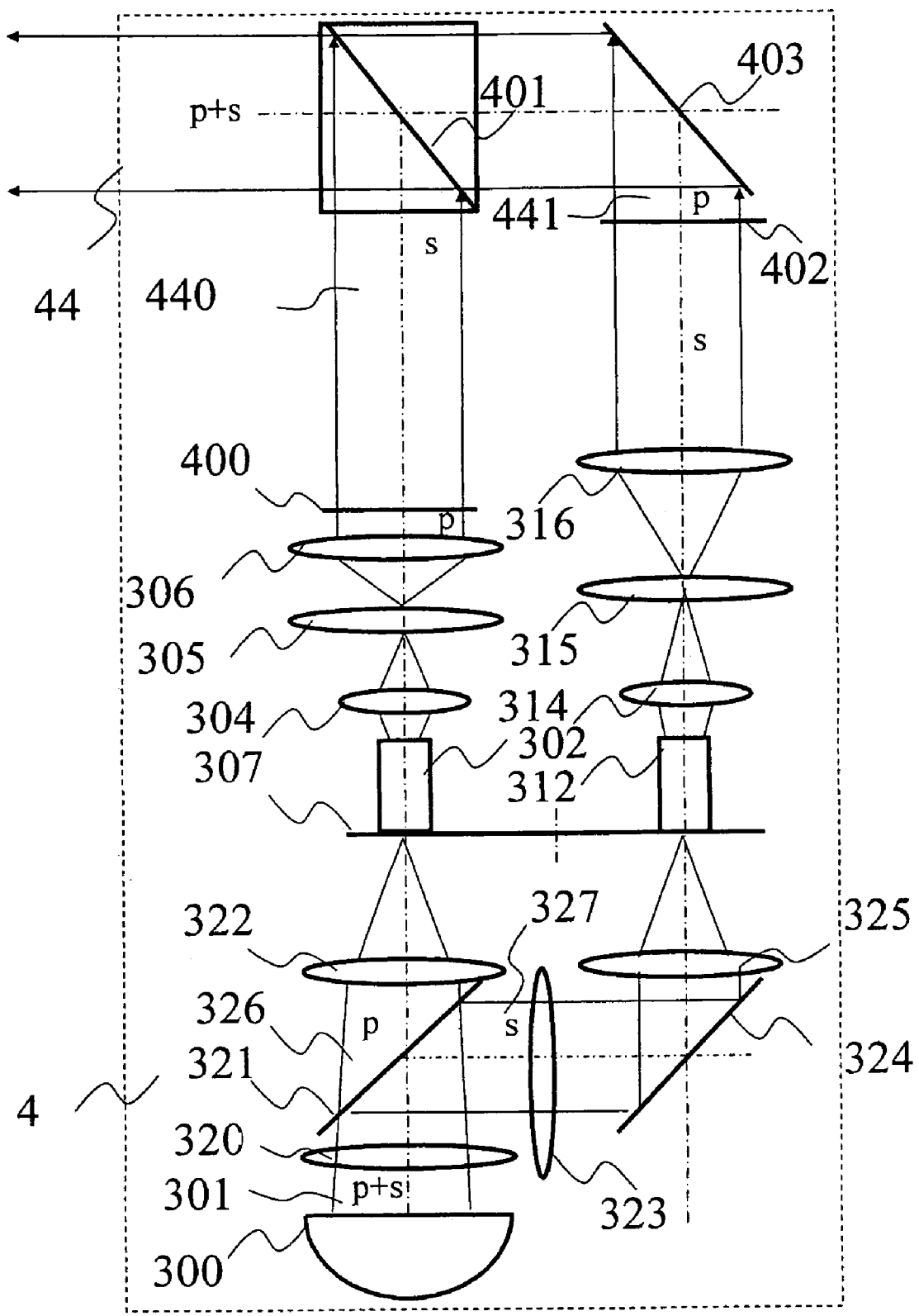
FIG. 4 illustrates an imaging system according to an alternative embodiment of the invention.

FIG. 4 illustrates in detail an imaging system 4 with imagers 400 and 402 of the transmissive LCD type.

The system 4 replaces the system 20 in the projector 2 illustrated with regard to FIG. 2. It comprises common elements, which bear the same references and will not be described further, in particular the source 300, the lenses 320, 322, 323, 325, 304 to 306 and 314 to 316, the splitter 321, the mirror 324, the wheel 307 and the guides 302 and 312.

The beam 326 collimated by the lenses 304 to 306 and p-polarized (i.e. linear polarization) along a first direction in the plane of FIG. 4, perpendicular to the direction of propagation of the beam) illuminates the LCD imager 400, which creates an s-polarized imaging beam 440 (i.e. having a linear polarization along a direction perpendicular to the plane of FIG. 4).

The beam 440 is reflected by a polarizing beam splitter 401 of the dichroic PBS type, as illustrated. According to alternative embodiments of the invention, the splitter 401 is replaced with other types of splitter, for example a polarizing splitter plate or a grating polarizer.

The beam 327 collimated by the lenses 314 to 316 illuminates the LCD imager 402, which creates a p-polarized imaging beam 441.

The beam 441 is reflected by the mirror 403 inclined at 45° to the axis of the beam 441 and passes through the polarizing beam splitter 401.

The two beams 440 and 441 then combine to form a single imaging beam 44.

Preferably, the distances separating the splitter 401 from the respective imagers 400 and 402 are the same.

Of course, the invention is not limited to the embodiments described above.

In particular, the invention applies to other types of imagers and especially to DMD-type imagers. As an illustration, in this case, in the embodiment shown in FIG. 3, the splitter 318 may be replaced with a first TIR-type beam splitter and the imager 319 may be replaced with a first DMD imager; behind the lens 306, the elements 308 and 309 are replaced with a mirror that reflects the beam along a perpendicular direction in order to illuminate a second beam splitter of the TIR type associated with a second DMD imager; each imaging beam thus created passes through a TIR splitter and the two differently polarized beams are then recombined in a polarizing beam splitter in order to form a single imaging beam.

Furthermore, the rectangular guides may be replaced with guides having a non-rectangular cross section, or more generally with any type of means for converting the light source and/or for making it uniform, for example a free-form lens (as described in patent application WO 2006/058885 entitled "Optical system and corresponding optical element". These conversion and/or uniformizing means are used to convert the circular cross section of the illumination beam into a rectangular cross section and to make the beam spatially uniform.

Moreover, the arrangement, the number and the shape of the optical elements for focusing or collimating the light beams are not limited to the examples described above. In fact these elements may be reduced or increased according to the various parameters associated with the space requirement, the optical quality and the size of the beams in particular.

The angles of inclination of the mirrors and of the beam splitters are not necessarily at 45° or 90° to the incident beams. According to the invention, they may take other values that make it possible to spatially split or, on the contrary, combine the illumination or imaging beams.

Advantageously, a system according to the invention employs a single colour wheel, thereby facilitating its implementation. According to alternative embodiments of the invention, two synchronized wheels may be implemented, each of the differently polarized source beams passing through one of the wheels.

According to the invention, any type of light source suitable for projection may be used, and in particular a light source with an elliptical reflector or a light source based on LEDs (light-emitting diodes).

The invention also applies to an application of the three-dimension projection type. Specifically, using a first imager for an image associated with one polarization and one eye, and a second imager for an image associated with a second polarization and the other eye, spectacles in which the right lens filters a different polarization from that filtered by the left lens then permits vision in three dimensions (assuming, of course, that the imagers display images suitable for projection in three dimensions).

The invention relates not only to an illumination/imaging system but also to a projector, in particular a back-projector or front projector) comprising such a system.

The invention claimed is:

1. Optical system for a projector, comprising:
   at least one illumination source suitable for producing a source illumination beam;
   at least a first polarizing beam splitter for splitting the source illumination beam into a first illumination beam linearly polarized along a first direction and a second illumination beam polarized perpendicular to the first direction;
   a colour wheel intersecting said first and second polarized illumination beams in two different regions, such that, at any instant when the first polarized illumination beam intersects a first segment of said colour wheel associated with a first colour and produces a first colour beam linearly polarized along the first direction, then the second polarized illumination beam intersects a second segment of the same colour wheel associated with a second colour which is different from the first colour, is complementary for the first color, and produces a second colour beam polarized perpendicular to the first direction;
   a first imager illuminated by the first colour beam linearly polarized along the first direction and producing a first imaging beam; and
   a second imager illuminated by the perpendicularly polarized second colour beam and producing a second imaging beam.

2. System according to claim 1, wherein it includes at least a second polarizing beam splitter suitable for combining the first imaging beam with the second imaging beam in order to form a third imaging beam.

3. System according to claim 1, wherein the first and second imagers are of the LCOS type.

4. System according to claim 1, wherein the first and second imagers are of the transmissive LCD type.

5. System according to claim 1, wherein the first polarizing beam splitter is of the grating polarizer type.

6. System according to claim 1, wherein the first polarizing beam splitter is of the dichroic type.

7. Projector comprising:
   at least one projection objective and
   an optical system comprising:
   at least one illumination source suitable for producing a source illumination beam;
   at least a first polarizing beam splitter for splitting the source illumination beam into a first illumination beam linearly polarized along a first direction and a second illumination beam polarized perpendicular to the first direction;
   a colour wheel intersecting said first and second polarized illumination beams in two different regions such that, at any instant when the first polarized illumination beam intersects a first segment of said colour wheel associated with a first colour and produces a first colour beam linearly polarized along the first direction, then the second polarized illumination beam intersects a second segment of the same colour wheel associated with a second colour which is different from the first colour, is complementary for the first color, and produce a second colour beam polarized perpendicular to the first direction;
   a first imager illuminated by the first colour beam linearly polarized along the first direction and producing a first imaging beam; and
   a second imager illuminated by the perpendicularly polarized second colour beam and producing a second imaging beam.

8. System according to claim 1, wherein the colour wheel comprises six segments of respective colours red, green, blue, cyan, magenta and yellow, and wherein, if the first colour is either red, green, blue, cyan, magenta or yellow, the second colour is respectively cyan, magenta, yellow, red, green or blue (see support page 6, lines 12-18).

9. Projector according to claim 7, wherein the colour wheel comprises six segments of respective colours red, green, blue, cyan, magenta and yellow, and wherein, if the first colour is either red, green, blue, cyan, magenta or yellow, the second colour is respectively cyan, magenta, yellow, red, green or blue (see support page 6, lines 12-18).

* * * * *